Sept. 19, 1944. E. D. LILJA ET AL 2,358,338
CONTROL SYSTEM
Filed April 13, 1940 4 Sheets-Sheet 1

INVENTOR
Edgar D. Lilja
Austin S. Norcross
BY Parker, Carlson, Pitzner Hubbard
ATTORNEYS

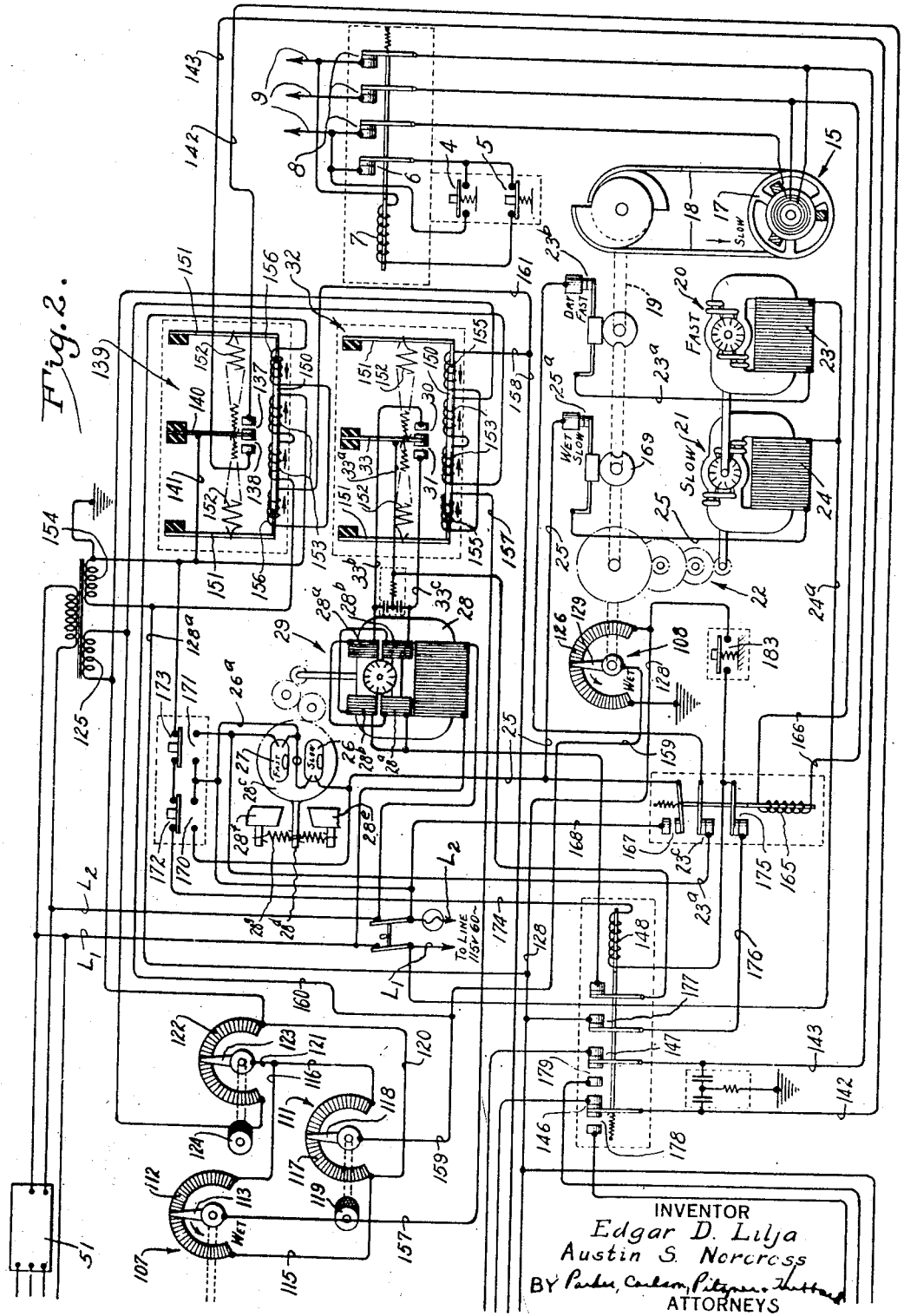

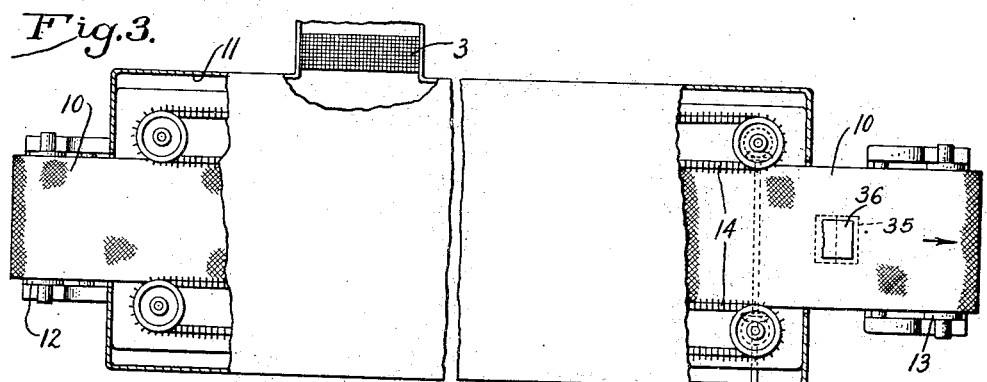
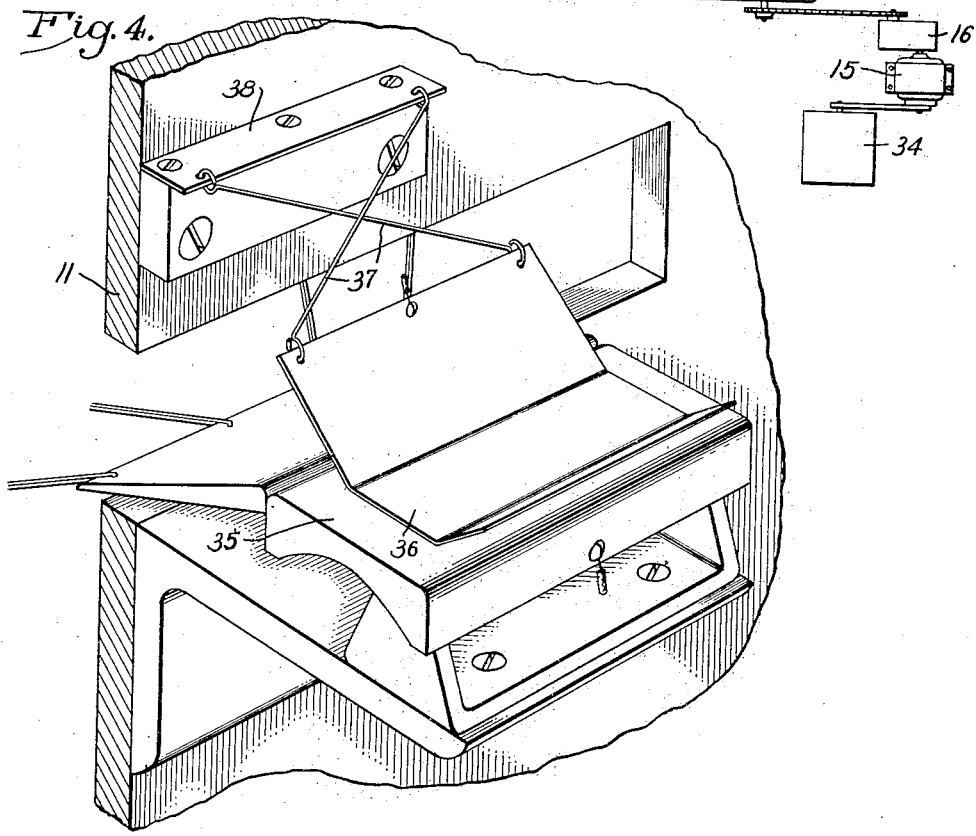

Sept. 19, 1944.   E. D. LILJA ET AL   2,358,338
CONTROL SYSTEM
Filed April 13, 1940   4 Sheets-Sheet 4

INVENTOR
Edgar D. Lilja
Austin S. Norcross
BY Parker, Carlson, Pitzner & Hubbard
ATTORNEYS Patented Sept. 19, 1944

2,358,338

UNITED STATES PATENT OFFICE 2,358,338

CONTROL SYSTEM

Edgar D. Lilja, Rockford, Ill., and Austin S. Norcross, Waban, Mass.; said Lilja assignor to Barber-Colman Company, Rockford, Ill., a corporation of Illinois Application April 13, 1940, Serial No. 329,480

20 Claims. (Cl. 34—52)

This invention relates generally to the automatic control of physical, chemical, or electrical conditions by modulating the position of a regulating device such as a valve, a voltage regulator, a speed changer, or the like. More particularly, the invention relates to controls of the so-called proportioning type wherein at least the primary response of the regulating device to a condition change follows and is proportional to such change.

One object is to provide a novel control of the above character in which condition changes are detected and amplified through a thermionic device which is operated at substantially a constant point on its characteristic curve.

Another object is to provide a proportioning control of the potentiometer type incorporating novel means for varying the condition range over which the proportioning action occurs.

A further object is to provide a proportioning control coupled with a novel means for indicating continuously the prevailing value of the condition being controlled.

Still another object is to provide, in the improved proportioning control, for imparting a slow secondary response to the regulating device to cause further corrective movement thereof and effect complete restoration of the controlled condition to a predetermined value.

The invention also resides in the novel structural character of the means for producing the secondary response and in the provision of means for enabling the condition value maintained by the system to be varied selectively and the operativeness of the entire system tested from time to time.

Other objects and advantages of the invention will become apparent from the following detailed description taken in connection with the accompanying drawings, in which Figures 1 and 2, when arranged with Fig. 2 at the right hand end of Fig. 1, constitute a schematic view and wiring diagram of a control system embodying the novel features of the invention.

Fig. 3 is a plan view, partially in section, of a drying apparatus adapted to be controlled by the system shown in Figs. 1 and 2.

Fig. 4 is a fragmentary perspective view of a part of the control system.

Figure 1:
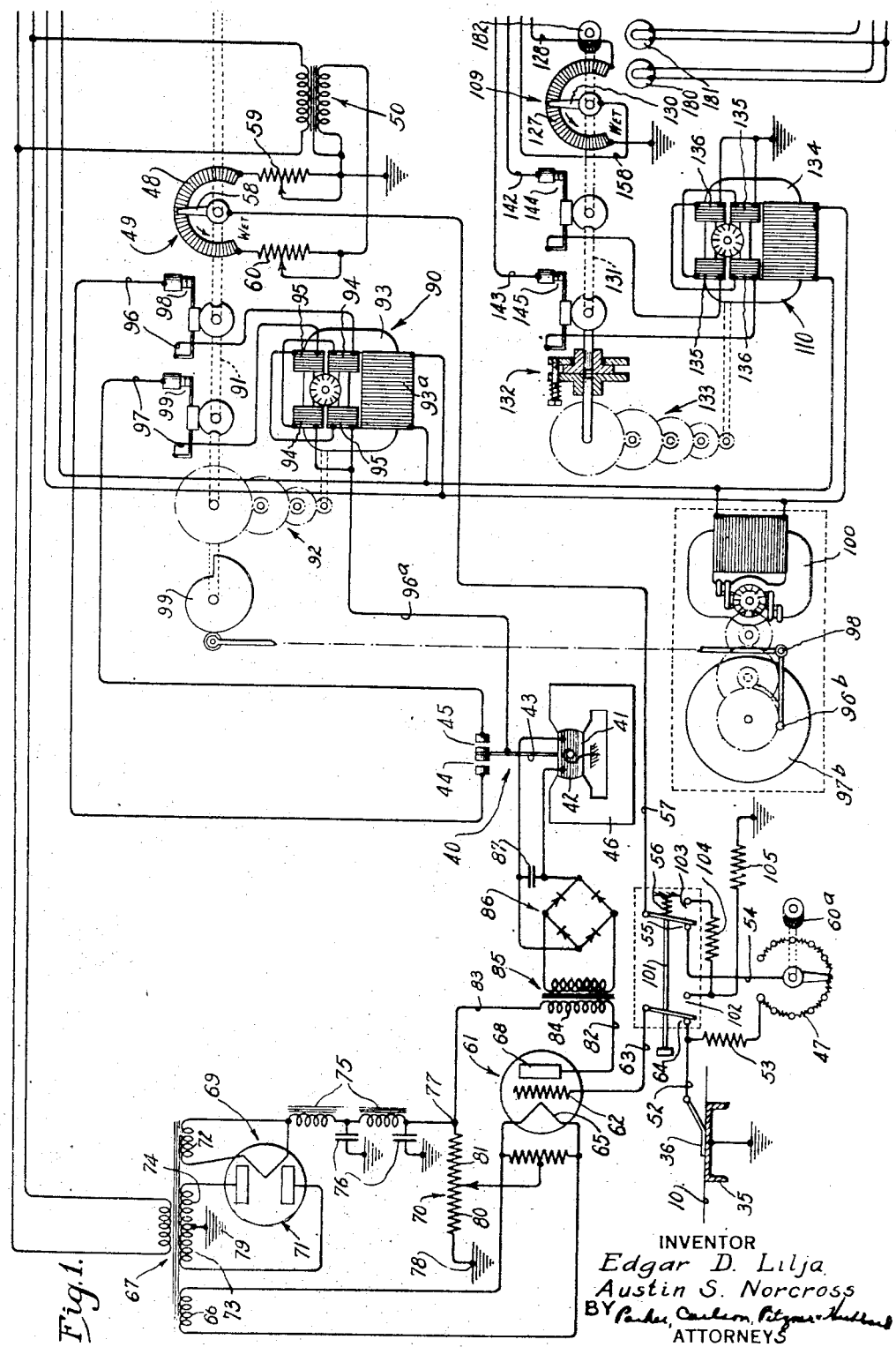
Figure 5:
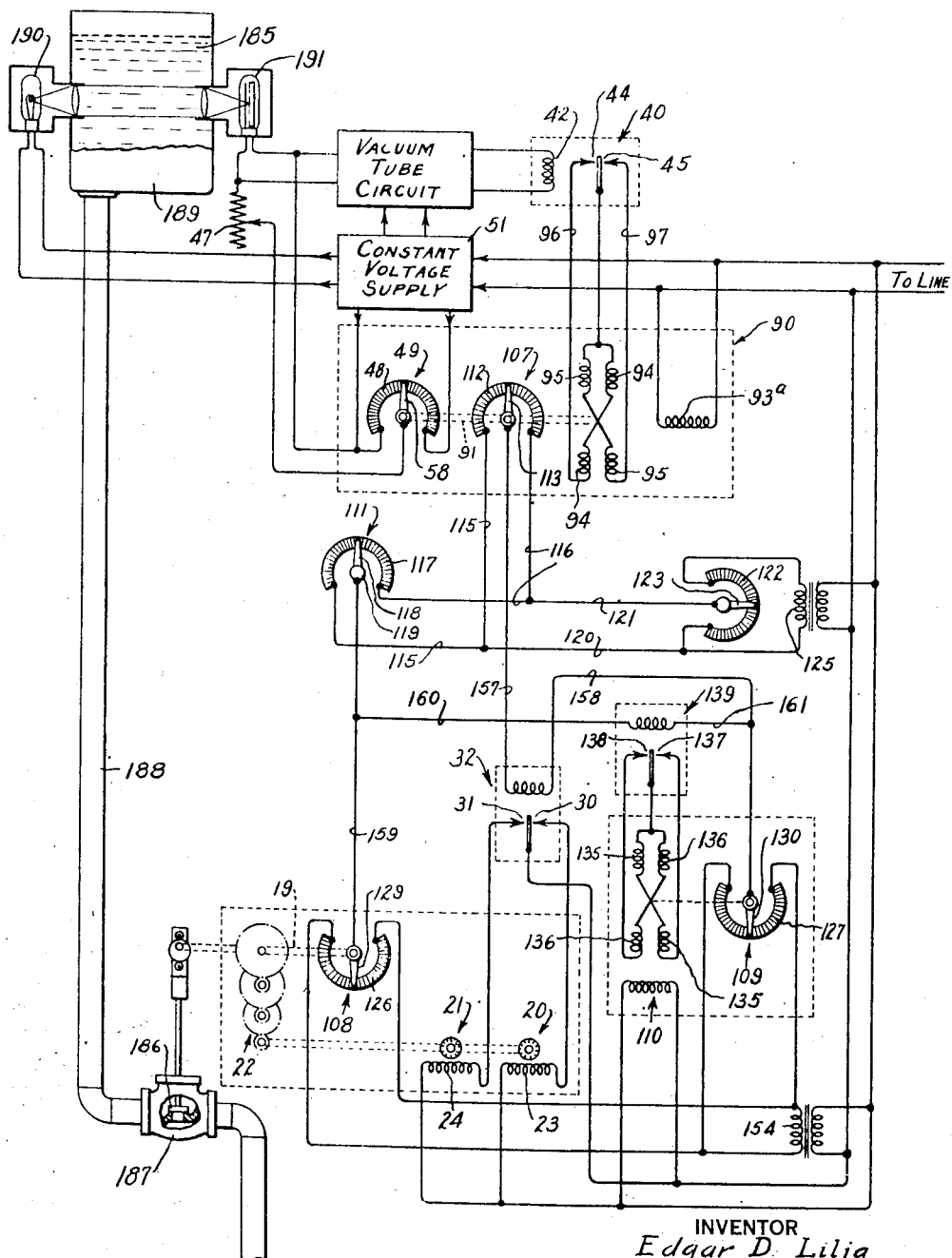
Fig. 5 is a schematic view and wiring diagram illustrating another typical use of the improved control.

The invention is applicable to the control of various kinds of regulating devices and for regulating a wide variety of conditions. For convenience of illustration, however, it is shown in Figs. 1 to 4 as applied to the automatic control of a speed changer for regulating the moisture content of a traveling web 10 of cloth while Fig. 5 illustrates the regulation of a valve to govern the color or opacity of a liquid. These typify the many uses to which the invention may be put. It is to be understood that we do not intend to limit the invention by their disclosure but aim to cover all modifications, alternative methods, constructions, and uses falling within the spirit and scope of the invention as expressed in the appended claims.

Referring first to Figs. 1 to 4, the moisture content of the web 10, as the case may be, is varied by a drier commonly known as a tenter and comprising a housing 11 providing an elongated chamber through which the web is fed from a wet roll 12 to a dry roll 13. Usually, the web is advanced through the chamber by an endless chain 14 carrying suitable clamps for gripping opposite side margins of the web to hold it taut. The chain sprockets are driven by an electric motor 15 operating through a suitable speed reducer 16 and supplied with current from power lines 9 under the control of switches 8. The latter close on energization of an electromagnet 7 having a holding circuit extending through a switch 6. Energization and deenergization of the magnet to close and open the switches 8 are controlled by start and stop buttons 4 and 5.

Air for drying the cloth is heated as by an exchanger 3 and preferably maintained at a uniform temperature. While the effective capacity of the drier may be varied in several ways, such regulation is effected in the present instance by varying the speed of the motor 15. This may be accomplished, for example, by modulating the position of a rotary member 17 (Fig. 2) connected through belts 18 to a shaft 19 which is turned in a counter-clockwise direction to increase the brush spacing and thereby decrease the motor speed. Reverse movement of the shaft results in an increase in speed and a corresponding decrease in the effective capacity of the drier.

Herein, the shaft 19 is arranged to be oscillated varying distances back and forth by a reversible electric operator comprising two motors 20 and 21 connected to the shaft by speed reduction gearing 22 and selectively energizable to turn the shaft slowly in speed-increasing and speed-decreasing directions respectively. The windings 23 and 24 of the motors are connected by a conductor 24ª to one terminal L1 of a power source. A conductor 25, having a cam operated limit switch 25ª interposed therein, connects the other terminal of the motor 21 to a mercury contactor switch 26 joined by a conductor 26ª to the other power terminal L2. The circuit for the motor 20 is controlled by a contactor switch 27 and extends to L2 through a conductor 23ª having a cam operated limit switch 23ᵇ and a normally closed switch 23ᶜ interposed therein, the switch 27 being connected to the conductor 26ᵃ.

The switches 26 and 27 form part of a relay 29 operated by a motor 28 reversible by selective short-circuiting of shading coils 28ᵃ and 28ᵇ and operating through suitable reduction gearing to oscillate a disk 28ᶜ on which the tubes of the switches are mounted. An arm 28ᵈ on the disk oscillates between stops 28ᵉ and 28ᶠ and springs 28ᵍ act on the arm to hold it in center position when the motor is idle, both switches 26 and 27 then being open. Selective short-circuiting of the coils 28ᵃ and 28ᵇ is controlled by switches 30 and 31 of a sensitive balanced relay 32 which is of special construction to be described later. The tongue 33 of the relay is joined by a conductor 33ᵃ to the common terminal of the shading coils 28ᵃ and 28ᵇ while the other coil terminals are connected by conductors 33ᵇ and 33ᶜ to the stationary contacts of the relay switches 30 and 31.

As a result of the arrangement described, the motors 20, 21 and 28 will be idle when both of the switches 30 and 31 are open. Closure of the switch 30 short-circuits the coils 28ᵃ causing the motor 28 to run counter-clockwise and turn the arm 28ᵈ against the stop 28ᶠ thereby closing the switch 27 to start the motor 20. The speed changer 17 is thus moved slowly in the speed-increasing direction thereby correspondingly decreasing the drying capacity of the tenter. Reverse movement occurs as a result of operation of the motor 21 in response to closure of the motor relay switch 26 following short-circuiting of the coils 28ᵇ by closure of the sensitive relay switch 31. In each instance, the speed changer continues to move at a slow rate so long as the switch 30 or 31 remains closed.

The automatic control constituting the present invention is housed within a control cabinet 34 (Fig. 3). It responds to fluctuations in the controlled condition, that is, the moisture content of the dried cloth, and operates to vary the position of the regulating device or speed changer so as to maintain the controlled condition accurately and substantially at a desired value. Such fluctuations are detected by continuously measuring an electrical characteristic, preferably the resistance, of the web 10 which varies with the moisture content. The measurement is made at a point beyond the outlet end of the drying chamber 11 as the web passes between two electrodes 35 and 36, one formed herein by the flat surface of a stationary bar adjustably mounted on the tenter frame. The upper electrode comprises a plate riding on top of the web and guided by cross links 37 pivoted on a block 38 insulated from the machine frame.

The electrodes, with the variable cloth resistance therebetween, are interposed in an electric circuit, and variations in voltage drop through the cloth resulting from changes in cloth resistance are utilized through a suitable vacuum tube arrangement to actuate a sensitive magnetic relay 40 (Fig. 1) by which selective operation of the control switches 30 and 31 is ultimately governed and the speed of the web driving motor 15 is varied to correct for deviations in moisture content from the desired value. Preferably, the relay is of the D'Arsonval type comprising a rotor 41 carrying a winding 42 and an arm 43 on which the common contact of control switches 44 and 45 is mounted. The rotor is pivotally supported between the poles of a permanent magnet 46 and a return spring is provided so that when the rotor winding is energized to a predetermined degree, the contact arm 43 will balance between the cooperating switch contacts, both control switches then being open. As the current rises above this predetermined value, the switch 45 will be closed. The switch 44 is closed in response to a fall in the relay energizing current.

To impress a voltage upon the cloth sample, the electrodes 35 and 36 are connected in series with a variable resistance 47 and part 48 of a potentiometer 49 which derives its potential from the secondary of a shielded transformer 50 the primary of which is energized from a voltage regulator 51 of the capacitor-reactor type which is substantially instantaneous in its action. As shown, the circuit extends from the grounded electrode 35 through the cloth 10, upper electrode 36, a conductor 52, a resistance 53, the resistance 47, a conductor 54, a switch 55 which is normally closed by a spring 56, a conductor 57, the arm 58, the potentiometer portion 48 and an adjustable resistance 59 to ground. By adjustment of the resistance 59 and a similar resistance 60, the required voltage gradient and range is obtained. The resistance 47 may be varied by manual adjustment of a knob 60ᵃ to compensate for variations in the resistance of different kinds and thicknesses of cloth.

The voltage drop between the electrodes is impressed upon an amplifying vacuum tube 61. For this purpose, the conductor 52 is connected to the tube grid 62 through a conductor 63 and a switch 64 normally held in closed position by the spring 56. The tube filament 65 derives its heating potential from the winding 66 of a transformer 67 energized from the regulator 51. High potential current is conveniently supplied to the plate 68 of the tube by a full wave vacuum tube rectifier 69 the output of which is impressed upon a voltage dividing resistor 70. The rectifier circuit includes a vacuum tube 71 having a filament energized from the secondary 72 of the transformer 67. Potential for the plate circuits for the rectifier tube is derived from windings 73 and 74. One side of the rectifier output circuit is extended through a filter comprising chokes 75 and condensers 76 to the terminal 77 of the potential divider 70. The other side is grounded at 79 and thereby extended to the grounded terminal 78 of the voltage divider.

Section 80 of the voltage divider provides the grid bias for the tube 61 while the section 81 furnishes the plate potential. The plate circuit extends through conductors 82 and 83 and the primary 84 of a transformer 85, the secondary of which serves to energize a full wave dry disk rectifier 86. The D. C. terminals of the latter are connected to the winding 42 of the galvanometer relay 40. A condenser 87 in parallel with the relay serves to filter out some of the cyclic current variations.

In accordance with the present invention, the relay 40, acting directly or indirectly through an additional relay, controls a power operator 90 which, following deviation of the controlled condition from the desired normal value, drives the arm 58 of the rheostat 49 in a direction to restore the voltage input to the tube 61 to normal and thereby rebalance the relay. The operator comprises a shaft 91 carrying the rheostat arm 58 and driven through reduction gearing 92 from a reversible electric motor 93 herein shown as of the shaded pole induction type having a main winding 93ᵃ constantly energized by alternating current and two sets of shading coils 94 and 95 selectively short-circuited under the control of the relay switches 44 and 45. For this purpose, a conductor 96ᵃ connects the common terminal of the coils to the relay arm 43 while the insulated terminals of the coil sets 94 and 95 are connected to the stationary switch contacts by conductors 96 and 97 having cam actuated limit switches 98 and 99 interposed therein.

With the circuit arrangement above described, it will be apparent that a decrease in electrode resistance below normal resulting from an increase in moisture content will cause the A. C. voltage impressed on the grid 62 and the A. C. component of the plate current through the transformer winding 84 to be reduced. The rectified voltage applied to the relay 40 is lowered resulting in closure of the switch 44 and short-circuiting of the coils 94 causing the rheostat arm 58 to turn counter-clockwise and thus increasing the voltage across the electrodes 35 and 36 and therefore the voltage input to the tube. Such action continues until the electrode potential has been restored to normal and the relay thus rebalanced which stops the motor 93. Conversely, in response to a decrease in moisture content below normal, the input to the tube will increase correspondingly resulting in an increased output current, closure of the relay switch 45, and operation of the motor 93 by the action of the coils 95 until the arm 58 has turned clockwise a distance sufficient to restore normal conditions in the tube.

As a result of the operation described above, the angular positions of the rheostat arm 58 and the shaft 91 will follow accurately the changes in the moisture content of the cloth and these positions constitute a continual indication of the moisture content. This indication may be transmitted by a pointer 96ᵇ coacting with a chart 97ᵇ calibrated in the desired units. For this purpose, the pointer may constitute one arm of a bell-crank pivoted at 98 and constituting the follower of a properly shaped cam 99 fast on the shaft 91. By equipping the pointer with a suitable marking device and by turning the chart 97ᵇ by a timing motor 100, a chart of the moisture fluctuations may be recorded. Of course, the movements of the shaft 91 may be transmitted electrically to a remote point where it is desired to record the moisture content indications.

The switches 55 and 64 may be opened by shifting a rod 101 thereby closing switches 102 and 103. This removes the electrode circuit and substitutes resistances 104 and 105 which are of equal resistance so that half of the voltage delivered by the potentiometer 49 is impressed on the grid circuit causing the balancing operator to assume a corresponding position which depends on the tube and circuit constants. Testing and adjustment of the circuits is thus facilitated.

The movements of the control shaft 91 with changes in the controlled condition may be utilized in various ways to produce the primary response of the speed changer proportional to and in a direction to correct for a change in the controlled condition. In the present instance, this primary response as well as the secondary or restoring response is effected electrically by an arrangement of bridge circuits controlled by a transmitting potentiometer 107 operated from the shaft 91, a balancing potentiometer 108 actuated in unison with the speed changer 17, a potentiometer 109 actuated by an electric motor operator 110 and controlling the secondary response, and a fourth potentiometer 111 herein shown as being manually adjustable.

Herein, the potentiometer 107 comprises a stationary resistance 112 divided by a movable terminal or slider arm 113 fast on the shaft 91 so as to turn counter-clockwise in response to an increase in moisture content and clockwise as the cloth becomes drier. To form one of the bridges, opposite ends of the resistance 112 are connected by conductors 115 and 116 to the terminals of the stationary resistance element 117 of the adjusting potentiometer 111. The element is divided by an arm 118 that may be turned by a knob 119 to vary the relative resistance values of the end portions and thereby enable the maintained moisture content to be changed as desired.

A selectively adjustable voltage, alternating in the present instance, is applied to the terminals of the bridge. To this end, the conductors 115 and 116 are joined by conductors 120 and 121 to one terminal of a resistance 122 and a slider 123 shiftable across the resistance by turning a knob 124. Opposite terminals of the resistance are joined to a secondary source 125 of alternating current so that the voltage applied to the bridge will be determined by the position of the slider 123. By virtue of such voltage adjustment, the amount of droop, that is, the extent of the primary movement or response of speed changer 17 which occurs upon a given deviation in moisture content of the cloth may be varied as desired.

The potentiometers 108 and 109 are connected to form a second bridge circuit. For this purpose, one terminal of each of their resistances 126 and 127 is grounded and the other terminals are connected by a conductor 128. The latter is joined by a conductor 128ᵃ to the ungrounded side of the current source 154 by which the bridge is excited. The resistance 126 is divided by a slider arm 129 fast on the shaft 19 so as to move in unison with the regulating member or speed changer 17. The resistance 127 is divided by a slider 130 fast on a shaft 131 which is driven through a spring engaged friction clutch 132 and speed reduction gearing 133 from a reversible motor 134 which rotates in opposite directions in response to selective short-circuiting of shading coils 135 and 136. To retard the rate of the secondary response or restoring action, a greater reduction is effected through the gearing 133 than through the gearing 22 so that the shaft 131 is turned by its motor at a substantially slower speed than the shaft 19, for example, about one-tenth of the speed of the latter shaft.

Short-circuiting of the shading coils 135 and 136 is controlled by switches 137 and 138 of a sensitive relay 139 having a tongue 140 grounded through a conductor 141 and thus connected to the grounded terminal of the shading coils. The other coil terminals are connected to the stationary contacts of the switches 137 and 138 through conductors 142 and 143 having interposed therein cam operated limit switches 144 and 145 and switches 146 and 147 which are normally held closed by a magnet 148, the function of which will be described later. Thus, in response to closure of the switch 137, the coils 135 will be short-circuited and the motor 134 will run in a direction to turn the arm 130 clockwise while reverse movement occurs while the switch 138 is closed.

The relays 32 and 139 are of the polarized type and preferably are of the same construction. Each comprises a horizontal armature bar 150 supported for frictionless endwise movement by two flexible strips 151 suspended on suitable bases which also support the tongues 140 and 33. Light contractile springs 152 transmit the armature movements to the tongues. The armatures are enclosed by exciting windings 153 which are distributed so that, when these windings alone are energized, the armatures are centered and the switch tongues are disposed midway between the stationary contacts, both switches being open. The windings 153 of both relays are excited by alternating current, in the present instance, supplied from transformer secondary windings 125 and 154.

The relays 32 and 139 are equipped with sets of control windings 155 and 156, each set comprising two coils connected in series and wound oppositely around opposite ends of the armature 150 and superimposed on the windings 153. A current flow through the control windings produces a magnetic field which opposes that of the exciting winding in one end portion and adds to it in the other end portion producing a resultant force that shifts the armature toward the strengthened field and away from the weakened field. Thus, current flowing in the windings 155 to produce fields directed as indicated by the arrows (Fig. 2) will cause the tongue 33 to move in a direction to close the switch 31. Since an unbalanced condition of the relay is caused by a change in phase as well as in magnitude of the voltage on the control winding, the relay is extremely sensitive and well suited for accurate response to balancing and unbalancing of the bridge circuits.

To position the regulating device 17 in accordance with the primary and secondary responses and with the selected adjustment of the potentiometer 111, the control windings 155 of the relay 32 are arranged to respond to the resultant of the potentials at all the sliders 113, 118, 129, and 130. For this purpose, opposite terminals of the windings 155 are connected by conductors 157 and 158 to the sliders 113 and 130 of the potentiometers 107 and 109 and the sliders 118 and 129 are joined by a conductor 159. As a result of this arrangement, the circuit balance is upset, for example, by counter-clockwise movement of the slider 113 in response to an increase in moisture content above the selected value. The voltage then impressed on the relay windings 155 will be directly proportional to the displacement of the slider 113 relative to the slider 118. Also, the direction of current flow through the windings 155 will produce magnetic fluxes directed as indicated by the arrows thereby closing the relay switch 31 which, through the motor relay 29, energizes the motor 21 to initiate a decrease in the speed of the cloth through the drier. As an incident to this, the slider 129 of the potentiometer 108 is turned counter-clockwise until the resulting voltage change between the sliders 129 and 130 is just equal and opposite to that between the sliders 113 and 118. The balance of the circuits is thus restored so that the relay windings 155 will be deenergized and the motor 21 stopped after a movement of the regulating device proportional to the increase in moisture content above normal. Reverse movement of the relay tongue 33 and the sliders 113 and 129 occurs in response to a fall in moisture content as a result of which the motor 20 is operated and the speed setting of the regulating device is increased in proportion to the condition decrease.

The changes in the position of the speed changer, which are thus produced immediately with moisture content deviations and are proportioned in magnitude according to such deviations, constitute the primary response of the control system. Because of their proportioning character, hunting of the regulating device is avoided.

The secondary response above referred to is provided for the purpose of causing movement of the regulating device beyond the position corresponding to a condition deviation so as to compensate for the shift of the condition control point which is an inherent characteristic of the above described proportioning action and restore the condition to the desired value. This secondary response is controlled by the relay 139, the control windings 156 of which are connected to the slider 129 by conductors 159 and 160 and to the slider 130 by conductors 158 and 161. They are thus energized in response to displacement of these sliders relative to each other. Whenever the balance of this bridge is upset as, for example, by the counter-clockwise movement of the slider 129 that occurs with an increase in moisture content, a voltage is impressed on the windings 156 producing magnetic fields directed as indicated by the arrows and causing movement of the armature in a direction to close the switch 138. This initiates operation of the motor 134 in a direction to turn the slider 130 counterclockwise and thereby reduce the voltage across the windings 156. This reduction occurs slowly at a rate determined by the gearing 133, and the change in the position of the slider 130, although restoring the balance in the one bridge, again upsets the balance in the circuit controlling the windings 155 of the relay 32 with the result that the switch 31 is again closed and the motor 21 again operated until the balance of relay 32 is reestablished by further movement of the balancing slider 129. As an incident to this, the tenter speed is further decreased which is reflected in a decrease in the moisture content of the cloth. Since the balancing potentiometer is operated faster than the restoring potentiometer, the balance of the relay 32 is restored periodically so that the movement of the regulating device by which the desired condition is restored takes place in successive steps. The average rate of repositioning the speed changer to produce the secondary response or restoring action is approximately equal to the speed of the shaft 131.

When the moisture content has returned to normal as a result of the secondary response above referred to, the balance of the bridge circuit controlling the relay 139 and the two controlling the relay 32 will have been reestablished and both motors 20 and 21 will stop. The system remains in this condition until the moisture content of the cloth again deviates from the selected value. If the cloth becomes too dry, the slider 113 and all of the other parts will move in the directions reverse to those above described and the secondary response or resetting action will occur in the opposite manner. The ultimate effect of the control as a whole is to adjust the capacity of the drier very accurately and without objectionable hunting so as to maintain a predetermined value of the moisture content of the dried cloth.

*Auxiliary controls*

Adjustment of the control system for the maintenance of a different moisture content in the cloth is effected by shifting the slider 118. Since the potentiometer 111 is connected in parallel with the potentiometer 107 to form one bridge, such shifting of the slider changes the position of the slider 113 at which the circuits are in balance. Thus, any desired control point, that is, the percentage of moisture, may be selected without affecting the moisture content indication given by the pointer 96^b. It should also be observed that adjustment of the resistance 47 as well as the slider 118 affects the actual moisture content that is maintained, 47 being changed to suit the cloth characteristics whereas 118 is adjusted to control the percentage of moisture that the control system maintains.

Provision is made for adjusting the amount of droop which occurs for a given deviation of the controlled condition. Herein, this is accomplished by manual adjustment of the resistance 122. Moving the slider 123 to the right decreases the voltage impressed on the transmitting potentiometer 107; consequently, a given movement of the slider 113 produces a smaller voltage change in the circuit of the relay 32 so that a shorter movement of the control shaft 19 is required to reestablish the balance. Accordingly, the so-called droop or condition change necessary to produce a given primary response is increased. Conversely, the droop is decreased by shifting the slider 123 counter-clockwise, thereby increasing the voltage applied to the transmitting part of the bridge circuit.

For the purpose of avoiding difficulties frequently encountered when the drying apparatus is started at high speed, provision is made for running the speed changer 17 to its slow speed position automatically when the apparatus is shut down. This condition is detected by a magnet 165 energized through conductors 166 from the circuit supplying the tenter motor 15. When energized, the magnet maintains the switch 23^c closed and the fast speed control switch 27 operative. Upon deenergization of the magnet, this switch is opened and a switch 167 is closed, thereby completing an auxiliary circuit for the motor 21 extending through a conductor 168 and the conductor 25. The motor thus runs independently of the automatic control system previously described until a cam 169 on the shaft 19 opens the limit switch 25^a. This stops the motor with the speed changer in its slowest speed position. The switch 167 is disabled automatically by reenergization of the magnet 165 when current is again made available to the tenter motor 15.

Manual control over the motors 20 and 21 is afforded through the provision of switches 170 and 171 arranged in parallel with the motor relay switches 26 and 27. The former switches are associated with normally closed switches 172 and 173 which, when the switches 170 and 171 are both open, maintain energization of the magnet 148 previously referred to through a circuit extending from the secondary 154 through the switches, a conductor 174, the magnet 148, a switch 175 which is closed when the magnet 165 is energized, a conductor 176, a switch 177 which is closed when the magnet 148 is energized, and the conductor 128.

When either of the switches 172 or 173 is opened as an incident to closure of the fast or slow manual switches 170 and 171, the magnet 148 is deenergized. This opens the switches 146 and 147 which normally connect the switches 137 and 138 of the polarized relay 139 to the shading coils 135 and 136 and closes switches 178 and 179 which connect the relay switches to signal lamps 180 and 181. The latter thus indicate the direction of unbalance of the relay 139 which unbalance may be overcome by turning a knob 182 to adjust the potentiometer 109 independently of the motor 134. Such adjustment is permitted by virtue of the friction clutch 132 interposed between the gearing 133 and the rheostat shaft 131 and enables the operator to move the slider 130 manually in a direction indicated by the lamps until the potentials at the sliders 129 and 130 have been equalized. Under this condition, the relay 139 will become balanced and the lamps extinguished indicating that the shift of the control point of the automatic control system, that may have been introduced by adjustment of the potentiometer 108 and speed changer by manipulation of the manually operable switches 170 and 171, has been eliminated. Then, the automatic control is restored by momentary closure of a switch 183 which establishes a shunt around the switches 175 and 177 and energizes the magnet 148 to disable the lamps and transfer the control of the relay 139 back to the shading coils 135 and 136. Energization of the magnet is then maintained through its holding circuit including the switches 175 and 177.

To illustrate its widely varying uses, the improved control is shown in Fig. 5 as applied to the maintenance of a uniform color condition of a liquid 185 which might, for example, be water under treatment, the stock supply for a paper-making machine, sewage, etc. The circuits and main operating parts being the same as those previously described, the disclosure has been simplified by omitting the details of the vacuum tube circuit, by omitting the motor relay 29 and the various auxiliary controls and by showing the relays and motor operators schematically. Since the same reference numerals have been used, the operation of the circuits as above described need not be repeated.

The regulating device for varying the color condition may take the form of the movable member 186 of a valve 187 which controls the flow of one or more treating liquids through a pipe 188 to a tank or sampling cell 189 in which the condition of the treated liquid is measured constantly. For this purpose, a beam of light derived from an electric lamp 190 excited from a constant voltage supply is projected through the liquid 185 in the tank and impinges on a photoelectric cell 191 which replaces the electrodes and cloth sample in the adaptation first described. The intensity of the illumination and therefore the resistance of the cell varies with changes in the color density of the liquid 185. These changes influence the tube and bridge circuits in the manner previously described and thus govern the selective excitation of the motors 20 and 21 to change the position of the valve member 186 in response to similar primary and secondary control actions and correct for each deviation of the color condition from the value for which the control system is adjusted.

We claim as our invention:

1. In a condition control system, the combination of, a reversible electric power driven operator having a driven device, one potentiometer comprising a resistance and a movable contact coacting therewith, means for moving said contact in opposite directions, a second potentiometer having a movable contact and a resistance coacting therewith and connected in parallel with said first resistance to form a bridge, a third potentiometer having a resistance and a coacting contact operatively connected to said device, a fourth potentiometer having a movable contact and a resistance connected in parallel with said third resistance to form a second bridge, means for energizing said bridges, a balanced relay connected to said bridges and responsive to the resultant of the potentials at all of said movable contacts and controlling said power driven operator to move said device in a direction to adjust said third potentiometer and rebalance the relay, a second electric power operator for actuating said fourth movable contact at a slow speed, and a second balanced relay in circuit with and responsive to the resultant potential at said third and fourth contacts and controlling said second operator to move said fourth contact in a direction to decrease the degree of unbalance of the second relay.

2. In a condition control system, the combination of a device variably movable in opposite directions, two bridge circuits each having a pair of movable contacts, a reversible electric power operator actuating said device and connected to one of a pair of said contacts so as to control the balance of one of said bridge circuits, means connecting said operator and said bridge circuits and operating in response to an unbalance of either of the bridge circuits to initiate operation of the operator in a direction to restore balance of the circuits, a second slower acting reversible electric power operator connected to the other of said pair of contacts to control the balance of one of said circuits, controlling means for said second operator responsive to a current produced by unbalance of said last mentioned circuit and operating the second operator in a direction to decrease the degree of unbalance of such circuit and simultaneously further unbalance the circuit controlling said first operator whereby to cause operation of the latter in steps, and means for varying the balance of one of said circuits in response to changes in the position of said device.

3. The combination with apparatus for producing condition changes by movement of, a regulating device of two bridge circuits each having a pair of movable contacts, a reversible electric power operator actuating said regulating device and connected to one of a pair of said contacts so as to control the balance of one of said bridge circuits, means connecting said operator and said bridge circuits and operating in response to an unbalance of either of the bridge circuits to initiate operation of the operator in a direction to restore balance of the circuits, a second slower acting reversible electric power operator connected to the other of said pair of contacts to control the balance of one of said circuits, controlling means for said second operator responsive to a current produced by unbalance of said last mentioned circuit and operating the second operator in a direction to decrease the degree of unbalance of such circuit and simultaneously further unbalance the circuit controlling said first operator whereby to cause operation of the latter in steps, means for varying the balance of one of said circuits with condition changes produced by movement of said device, and means for varying the balance of one of said circuits for selectively adjusting the condition value maintained by said apparatus.

4. In a condition control system, the combination of, a reversible electric power driven operator having a driven device, four resistances interconnected to form two bridges, sliders coacting with the respective resistances, one being connected to said reversible operator and movable in unison with said device, means for moving a second one of said sliders, a balanced relay in circuit with all of said resistances so as to respond to the potentials at all of said sliders and controlling said operator to move one of said sliders and said device in a direction to rebalance the relay, a second electric power operator for moving a third one of said sliders at a rate substantially slower than that of said first slider, and a second balanced relay responsive to the potentials at the contacts of the bridge including said third slider and controlling said second operator.

5. The combination with apparatus for producing condition changes by movement of a regulating device of, a plurality of potentiometers interconnected to form a circuit adapted to be unbalanced by operation of certain of the potentiometers and rebalanced by operation of other of the potentiometers, a reversible electric power operator actuating said regulating device and one of said potentiometers, means connecting said circuit and said reversible operator and operating in response to current produced by an unbalance of said circuit to operate one of said potentiometers in a direction to rebalance the circuit, means for actuating a second one of said potentiometers to unbalance said circuit in response to condition changes produced by said apparatus, a third potentiometer forming a part of said circuit and coacting with one of said first two potentiometers to form a bridge, a second slower acting reversible electric power operator responsive to an unbalance of said bridge, and means connecting said second operator and said third potentiometer and operable to actuate the latter to reduce the degree of unbalance of said bridge and simultaneously unbalance said circuit to cause a secondary response in the positioning of said device by said first operator.

6. In a condition control system, a bridge circuit including more than two potentiometers controlling the circuit balance and each having a movable contact terminal, a reversible electric power operator having a driven device and connected to one of said potentiometers, a balanced relay connected to said circuit and said operator and responsive to the resultant potential at the intermediate terminals of all of said potentiometers and operable when unbalanced to actuate said operator and move said device in a direction to adjust one of said potentiometers and rebalance the relay, means for modulating a second one of said potentiometers, a second slower acting reversible electric power operator connected to a third one of said potentiometers, and a second relay controlling said second operator and responsive to changes in the resultant potential between the intermediate terminals of said first and third potentiometers.

7. In a condition control system, the combination of a device movable varying distances in opposite directions, a thermionic amplifier having an input circuit variably energized, a member movable in opposite directions to effect opposite changes in the current in said input circuit, a reversible electric power operator, means responsive to deviation of the output current of said amplifier from a predetermined value and operable to initiate operation of said operator and actuation of said member in a direction and through a distance sufficient to restore the output current to said predetermined value, a second reversible electric power operator for modulating said device, means responsive to changes in the position of said member and operating said second operator to cause said device to respond immediately and in proportion to changes in the position of said member, and secondary means connected to said second operator and operable in response to movement of said member out of a predetermined position to initiate operation of said second operator and cause continued movement of said device at a slower rate and in a direction to restore said condition to a predetermined value.

8. A control for apparatus for producing condition changes having, in combination, a regulating device movable varying distances in opposite directions to regulate said apparatus and cause the value of the condition regulated thereby to be increased and decreased, a system for measuring changes in the condition produced by said apparatus comprising a thermionic amplifier having an input circuit, means for detecting changes in said condition and variably energizing said input circuit correspondingly, an independently movably member movable in opposite directions to effect opposite changes in the current in said input circuit, a reversible electric power operator, means responsive to deviation of the output current of said amplifier from a predetermined value to actuate said member in a direction and through a distance sufficient to produce restoration of the output current to said predetermined value whereby to cause said member to follow the changes in said condition, a second reversible electric power operator for actuating said regulating device, and means responsive to changes in the position of said member and initiating operation of said second operator to change the position of said device immediately and in proportion to the change in the position of said member and then to continue such changes at a slower rate until a predetermined value of said condition has been restored.

9. In a condition control system, the combination of, a device movable varying distances in opposite directions, a thermionic amplifier having input and output circuits, means for varying the current in said input circuit, a member movable in opposite directions to effect opposite changes in the current in said input circuit, means responsive to deviation of the output current from a predetermined value to actuate said member and vary the input current in a direction and by an amount sufficient to restore said predetermined output current value, a relay having an armature movable in opposite directions from a neutral position to move said device in opposite directions, means variably energizing said relay in accordance with the changes in the position of said member, and means for changing the energization of said relay in response to the movements of said device and in a direction to restore said relay armature to said neutral position.

10. In a system of the character described, the combination of a member movable varying distances in opposite directions, a thermionic amplifier having input and output circuits, means operable selectively to adjust the value of the current in said input circuit, a relay variably energized in response to current changes in said output circuit and having an armature movable between spaced positions through a neutral position, a voltage regulator in said input circuit, a reversible motor driven operator controlled by said relay and having a driven element operable upon movement of said armature to one of said positions to actuate said regulator in a direction to restore said relay armature to said neutral position, a second reversible power operator for actuating said member, and means responsive to the movements of said driven element to control said second operator to variably position said member in accordance with changes in the position of the element.

11. The combination with apparatus for producing condition changes by movement of a regulating device, of a balanced relay, means operable to upset the balance of said relay in opposite directions, a reversible electric power operator having a driven element variably controlling the energization of said relay, means responsive to unbalancing of said relay by a condition change to operate said operator and said element in a direction and through a distance sufficient to rebalance the relay, a second balanced relay the balance of which is upset in opposite directions in response to opposite movements of said element, balancing means for said second relay, a second electric power operator for actuating said regulating device and balancing means, means responsive to unbalancing of said second relay by a change in the position of said element to operate said second operator in a direction and through a distance sufficient to rebalance the second relay, and means responsive to deviations in the position of said element from a predetermined point to unbalance said second relay in a direction to cause slow restoration of said condition to a predetermined value and the position of said element to said predetermined point.

12. The combination with apparatus for producing condition changes by movement of a regulating device, a reversible electric power operator having a driven element, means responsive to condition changes produced by said apparatus to operate said operator and cause said element to follow such changes whereby the instantaneous position of said element indicates the prevailing value of said condition, a balanced relay connected to said element and unbalanced in opposite directions in response to opposite movements of the element, balancing means for said relay, a second electric power operator for actuating said regulating device and balancing means, means responsive to unbalancing of said relay by a change in the position of said element to operate said second operator in a direction and through a distance sufficient to rebalance the relay, and manually operable means by which the balance of said relay may be upset to vary the relation between the positions of said regulating device and said element.

13. The combination with apparatus for producing condition changes by movement of a regulating device, a reversible electric power operator having a driven element, means responsive to condition changes produced by said apparatus to operate said operator and cause said element to follow such changes whereby the instantaneous position of said element indicates the prevailing value of said condition, a balanced relay connected to said element and unbalanced in opposite directions in response to opposite movements of the element, a circuit controlling said relay including a voltage supply and a balancing means, and a second electric power operator for actuating said regulating device and balancing means and operable in response to unbalancing of said relay to move said device in a direction and through a distance sufficient to rebalance said relay.

14. The combination with apparatus for producing condition changes by movement of a regulating device, a reversible electric power operator having a driven element, means responsive to condition changes produced by said apparatus to operate said operator and cause said element to follow such changes whereby the instantaneous position of said element indicates the prevailing value of said condition, a balanced relay connected to said element and unbalanced in opposite directions in response to opposite movements of the element, a second electric reversible power operator for actuating said regulating device, and mechanism controlled by said relay and controlling said second operator to reposition said device first with a primary response proportional to the amount of the change in said condition and then with a subsequent slower secondary response restoring the condition to a predetermined value.

15. In a condition control system, the combination of a regulating device, a reversible electric power operator having a driven element, a balanced relay connected to said element and unbalanced in opposite directions in response to opposite movements of said element, balancing means for said relay, a second electric power operator for actuating said regulating device and balancing means, means responsive to unbalancing of said relay by a change in the position of said element to operate said second operator in a direction and through a distance sufficient to rebalance the relay, a third reversible electric power operator having a driven member movable at a slower speed than said device, means controlling the direction and extent of operation of said third operator in response to variations in the relative positions of said device and member, and means controlled by said member and controlling said relay to operate said second operator and cause further movement of said device.

16. The combination with a device variably movable in opposite directions, a normally balanced magnetic relay, a reversible electric power operator for actuating said device in opposite directions when said relay is unbalanced in opposite directions, an instrument for varying the energization of said relay, balancing means for said relay connected to said operator so as to be movable in unison with said device, means including an independently movable member for varying the energization of said relay to produce a secondary response in the movement of said device, a second reversible electric power actuator for operating said member at a substantially slower speed than said device, manually controllable means by which said operator may be controlled to change the position of said device independently of said instrument, and manually operable means by which said member may be moved independently of said actuator to rebalance said relay.

17. The combination with apparatus for producing condition changes by movement of a regulating device, a reversible power operator for actuating said device, means responsive to condition deviations produced by said apparatus and controlling said operator to produce a primary response and position said device in proportion to each condition change, a second reversible power operator, a clutch having a member driven from said second operator and operable to permit movement of the member independently of the operator, means connecting said member and said second operator for operation of the former at a substantially slower speed than said device, mechanism responsive to changes in the relative positions of said device and member to control said second operator, and means controlled by said member and controlling said first operator to produce a secondary response in the positioning of said device.

18. The combination with apparatus for producing condition changes by movement of a regulating device, a normally balanced magnetic relay, a reversible electric power operator adapted to operate said device and selectively controlled by said relay to operate in opposite directions corresponding to the direction of unbalance of the relay, a bridge circuit connected to said relay and controlling the balance thereof, said circuit including three potentiometers each adjustable to vary the balance of the circuit, means for detecting condition changes produced by said apparatus and operating one of said potentiometers to unbalance the relay by an amount corresponding to the condition change, means connecting a second one of said potentiometers to said operator to operate the latter in a direction to rebalance the relay and thereby proportion the movement of said device in accordance with the condition change, and manually operable means for adjusting said third potentiometer to vary the position to which said device is moved by said operator at a given value of said condition.

19. In a condition control, the combination of a first potentiometer having a voltage impressed across the terminals of its resistance element, a second potentiometer, a magnetic relay having control switches and a winding with terminals respectively connected to the movable contacts of said potentiometers whereby to apply balanced potentials to said winding, means operable to adjust the movable contact of one of said potentiometers and unbalance the potentials applied to said winding, a reversible electric motor driving means controlled by said relay and operable in response to unbalancing of said potentials to drive the movable contact of the other of said potentiometers to rebalance said potentials, means providing a voltage source impressed on the resistance element of said second potentiometer, and selectively adjustable means for varying the value of said last mentioned voltage.

20. In a condition control, the combination of two independently operable potentiometers, a magnetic relay having a winding with terminals respectively connected to the movable contacts of said potentiometers whereby to apply balanced potentials to said winding, means operable to adjust the movable contact of one of said potentiometers and unbalance the potentials applied to said winding, a reversible electric motor driving means controlled by said relay and operable in response to unbalancing of said potentials to drive the movable contact of the other potentiometer to rebalance said potentials, means impressing separate voltages on the resistance elements of said potentiometers, and selectively adjustable means by which the voltage applied to one of said resistance elements may be varied to adjust the amount of movement of the motor driven contact resulting from a given displacement of said condition responsive contact.

EDGAR D. LILJA.
AUSTIN S. NORCROSS.